United States Patent
Scheim et al.

(10) Patent No.: US 11,914,051 B2
(45) Date of Patent: Feb. 27, 2024

(54) SYSTEM AND METHOD FOR DETERMINING ACCURATE POSITIONS OF STATIONARY GLOBAL NAVIGATION SATELLITE SYSTEM SENSORS

(71) Applicant: Tupaia Ltd., Ramat-Hasharon (IL)

(72) Inventors: Kobi Scheim, Pardess-Hanna (IL); Nadav Lavi, Ramat-Hasharon (IL)

(73) Assignee: TUPAIA, Ramat-Hasharon (IL)

( * ) Notice: Subject to any disclaimer, the term of this patent is extended or adjusted under 35 U.S.C. 154(b) by 633 days.

(21) Appl. No.: 16/952,932

(22) Filed: Nov. 19, 2020

(65) Prior Publication Data

US 2021/0149061 A1    May 20, 2021

Related U.S. Application Data

(60) Provisional application No. 62/937,814, filed on Nov. 20, 2019.

(51) Int. Cl.
| | |
|---|---|
| *G01S 19/43* | (2010.01) |
| *G01S 19/31* | (2010.01) |
| *G01S 19/25* | (2010.01) |
| *G01S 19/07* | (2010.01) |

(52) U.S. Cl.
CPC .......... *G01S 19/43* (2013.01); *G01S 19/072* (2019.08); *G01S 19/254* (2013.01); *G01S 19/31* (2013.01)

(58) Field of Classification Search
None
See application file for complete search history.

(56) References Cited

U.S. PATENT DOCUMENTS

| | | | |
|---|---|---|---|
| 2017/0116851 A1* | 4/2017 | Burke | G08G 1/0129 |
| 2019/0137631 A1 | 5/2019 | Rayudu et al. | |
| 2020/0386898 A1* | 12/2020 | Moe | G01C 15/08 |

FOREIGN PATENT DOCUMENTS

| | | |
|---|---|---|
| CN | 104316943 A | 1/2015 |
| KR | 101229129 B1 | 2/2013 |

OTHER PUBLICATIONS

Joosten et al., "GNSS Three Carrier Phase Ambiguity Resolution using the LAMBDA-method", Mathematical Geodesy and Positioning, Delft University of Technology, 1999.

(Continued)

*Primary Examiner* — Frantz Bataille
(74) *Attorney, Agent, or Firm* — M&B IP Analysts, LLC

(57) ABSTRACT

A system and method for determining accurate positions of stationary global navigation satellite system (GNSS) sensors are provided. The method comprises triggering collection of satellite measurements by each of at least a first stationary GNSS sensor and a second stationary GNSS sensor, wherein the satellite measurements are collected per epoch; determining a position of the first stationary GNSS sensor using the satellite measurements collected by the first stationary GNSS; and determining a position of the second stationary GNSS sensor using the satellite measurements collected by the second stationary GNSS and at least the determined position of the first stationary GNSS, wherein the first stationary GNSS sensor is deployed in the vicinity of the second GNSS sensor.

29 Claims, 5 Drawing Sheets

(56) References Cited

OTHER PUBLICATIONS

Laurichesse, Denis, "Innovation: Carrier-Phase Ambiguity Resolution: Handling the Biases for Improved Triple-Frequency PPP Convergence", GNSS Position Navigation Timing: GPS World, Apr. 3, 2015.
International Search Report and Written Opinion of International Searching Authority for PCT/US2020/061298, ISA/RU, Moscow, Russia, dated Mar. 18, 2021.
Muller, M. D. et al. Ozone from GOME Data Using Neural Network Technique. ERS-Envisat Symposium "Looking down to earth in the new Millenium", ESA Special Publication 461, CD-ROM, ISBN 92-9092-685-6, ESA Publications Division, Noordwijk, Holland, 2000, [online] [retrieved on May 3, 2021]. Retrieved from , chapter 3.2.

\* cited by examiner

SYSTEM AND METHOD FOR DETERMINING ACCURATE POSITIONS OF STATIONARY GLOBAL NAVIGATION SATELLITE SYSTEM SENSORS

CROSS-REFERENCE TO RELATED APPLICATIONS

This application claims the benefit of U.S. Provisional Application No. 62/937,814, filed on Nov. 20, 2019, the contents of which are hereby incorporated by reference.

TECHNICAL FIELD

This disclosure generally relates to a method and a system to determine accurate positions of stationary GNSS sensors.

BACKGROUND

A satellite-based positioning system relies on a signal transmitted from satellites that propagate through the atmospheric layers and reach the end user equipment antenna. There are a few error sources affecting the accuracy of the range measurements. Such errors can be classified roughly into two segments: errors originated in space, and ground associated error sources. For example, two elements in the atmosphere that are known to affect the signal propagation modeled by added delay are the Troposphere and the Ionosphere. The Ionosphere and Troposphere affects differently the code phase and the signals carrier phase. Other space error sources reside in the satellite orbits and more specifically the satellites antenna position and orientation in time along with the satellites clock error.

The second errors segment, namely, the ground level associated errors, include, for example, obstacles (e.g., building, bridges, hilly terrains, etc.) at the users' close vicinity inducing additional delay to the satellites' signals that further diverge the signal propagation from a vacuum-like clear line-of-sight (LOS) propagation condition. With the receivers' close vicinity to propagation conditions, there is a common differentiation between open-sky conditions where a GNSS receiver has a single direct propagation path to all visible satellites and to terrain with the other notions such as hilly terrain, urban canyon, and the like, each representing a different scenario with non-clear-sky visibility. As such, signals measured by the GNSS receivers turn into inaccurate range measurements in such terrains.

Specifically, GNSS receiver errors are mainly caused by signal refractions and diffractions modeled by multipath (MP) channels where two basic classes exist: a line of sight signal element exists combined with non-direct signal echoes are present, and non-line-of-sight (NLOS) channels where a direct propagating signal element hardly exist. Errors resulting from the receiver range measurements due to the later class of channels are considered more complex to correct.

Further, to efficiently correct receiver errors, the following should be addressed: satellite and atmosphere originated errors (e.g., Ionosphere and Troposphere induced errors) and errors due to receiver's close vicinity to deduce accurate receiver positioning. This is very difficult as the multi-path error is a result of the surrounding environment which varies in space and time as the users change in position, and the satellites are orbiting earth thus appear in different azimuth and elevation in time. The urban terrain (environment) is even more complex for GNSS based positioning as the sky visibility is limited due to buildings and street geometry resulting in less satellites received with respect to an open sky case.

The related art proposed several solutions for high accuracy GNSS receivers. One solution is based on real time kinematics (RTK), where GNSS receivers ('base' and 'rover') exchange carrier phase information in real-time, such that both receivers are locked on the received satellites carrier phases continuously. The differencing of the carrier phase measurements removes most of the Ionosphere, Troposphere and satellites induce errors to a very low level and assist in deriving relative distances between the base and the rover. Knowledge on the exact base location enables the calculation of the absolute rover position. In a conventional RTK technique, the error increases as function of the distance between the base and the rover and the practical distances are below 5 km. Further, RTK solutions are very sensitive to multipath channels. In addition, due to the requirement of continuous communication between the rover and the base, a conventional RTK technique is limited to a few receivers per operation. Thus, as RTK base stations are relatively sparsely deployed, implementation of RTK is not scalable for large numbers of mobile devices.

Another set of solution is a precise point positioning (PPP) which either conducted in real-time or post measurement. The PPP process includes removing the various errors using different external data sources. Several correction data sources exist in the market to form a variety of PPP solutions. The most known correction sources are provided by NASA, continuously operating reference station (CORS) and ESA, and include exact orbits, clock biases, differential clock biases (between pairs of satellites), Ionospheric delays, and Tropospheric delays. The corrections are provided with substantial delay (in the order of days) and are suitable for post processing purposes and non-real-time applications. Other similar corrections are provided using satellite-based augmentation system (SBAS) in real-time.

Commercial real time correction services are typically available in the form of proprietary protocol structure, (e.g., Trimble RTX product). This type of service is coupled to the companies offered equipment and provides premium performance. The service is based on a network of ground based installed equipment with typical inter-site distance of 10-100 km. The sites, also known, as reference stations (RS) collect real time measurements and compute the local sites error elements, repeatedly. Collecting the data for several RSs in an area further enables generating an artificial RS corrections model as if an RS exists within a user's close vicinity. The corrections are available to the end user by internet IP protocol or by dedicated satellite broadcast service globally (non-GNSS satellite). This method of local corrections extraction and wide area distribution requires GNSS receivers integrated with PPP corrections handling (i.e., decoding and integration with the receiver calculation engines). The PPP is considered to reach an accuracy level of few cm's in open-sky conditions.

Introducing dual frequency receivers has opened another opportunity in improving receivers' accuracy autonomously. Namely, receivers utilize the measured data on multiple channels to remove external error sources, particularly Ionospheric errors. One Ionospheric removal scheme, Ionospheric free linear combination, mixes the code and/or phase observables by properly scaling with their corresponding frequency term to remove the Ionospheric delay.

All the above-noted approaches are limited, as such, to only improve GNSS receiver accuracy with open-sky visibility conditions by reducing the accumulated errors along the signal propagation path. That is, such solutions fail to correct the close vicinity interferences effect associated particularly in, for example, urban environments where open-sky visibility is limited.

Therefore, it would be advantageous to provide a solution that overcomes the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for determining accurate positions of stationary global navigation satellite system (GNSS) sensors. The method includes triggering collection of satellite measurements by each of at least a first stationary GNSS sensor and a second stationary GNSS sensor, wherein the satellite measurements are collected per epoch; determining a position of the first stationary GNSS sensor using the satellite measurements collected by the first stationary GNSS; and determining a position of the second stationary GNSS sensor using the satellite measurements collected by the second stationary GNSS and at least the determined position of the first stationary GNSS, wherein the first stationary GNSS sensor is deployed in the vicinity of the second GNSS sensor.

Certain embodiments disclosed herein include a system for executing a process for determining accurate positions of stationary global navigation satellite system (GNSS) sensors. The system comprises a processing circuitry; and a memory, the memory containing instructions that, when executed by the processing circuitry, configure the system to: trigger collection of satellite measurements by each of at least a first stationary GNSS sensor and a second stationary GNSS sensor, wherein the satellite measurements are collected per epoch; determine a position of the first stationary GNSS sensor using the satellite measurements collected by the first stationary GNSS; and determine a position of the second stationary GNSS sensor using the satellite measurements collected by the second stationary GNSS and at least the determined position of the first stationary GNSS, wherein the first stationary GNSS sensor is deployed in the vicinity of the second GNSS sensor.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
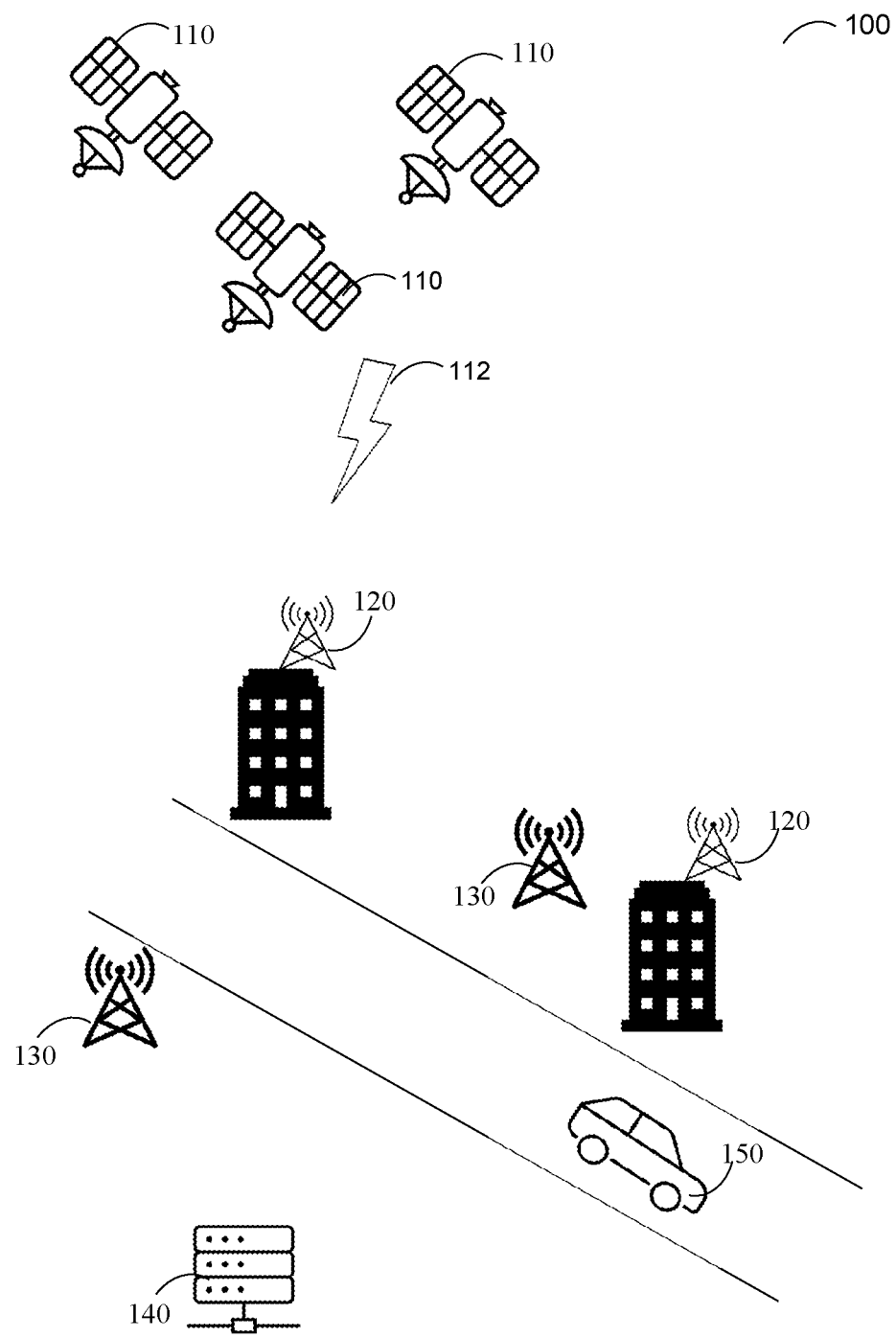
FIG. 1 a schematic diagram of an urban environment utilized to describe the various disclose embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

According to some example embodiment, a system and method for determining accurate positions of stationary GNSS sensors are provided. The disclosed method allows to further correct measurements of non-stationary GNSS receivers by using the positions of the stationary sensors as a reference. The system, in an embodiment, includes a plurality of sky-level mounted sensors (hereinafter sky-level sensors), a plurality of ground-level mounted sensors (hereinafter ground-level sensors), and a positioning server. The positioning server is configured to determine or otherwise correct the position of each such sensors. The sky-level sensors and ground-level sensors are both stationary sensors.

The corrections, as computed by the positioning server, based on epoch measurements provided the sky-level and ground-level sensors provide two components. In some configurations, the corrections may be computed locally by each sensor (e.g., sky-level) without the server.

FIG. 1 is a schematic diagram of an urban environment 100 utilized to describe the various disclosed embodiments. A plurality of satellites collectively labeled "110", orbiting in space potentially of multiple constellations transmit GNSS signals 112.

Also illustrated in FIG. 1, is a plurality of sky-level sensors (e.g., rooftop mounted) 120 and ground-level sensors (e.g., street mounted) 130. Both sensors 120 and 130 are configured to receive GNSS signals 112 with dual frequency and multi constellation capabilities and provide real-time raw measurements in both code and carrier phase and complementary information such as tracking status, SNR, and such. It should be noted that sensors 120 and 130 are GNSS stationary sensors. Further, such GNSS receivers are simple and are not surveying grade, thus are not designed to provide highly accurate positioning results as a standalone receiver.

In modern urban cities there are many deployed devices, for a variety of applications, with GNSS signals receiving capabilities, that can be utilized as sensors 120, 130, or both. For example, cellular communication devices, such as cellular base-stations/cells installed in a variety of locations, such as skyscrapers, buildings' rooftops, street poles, and buildings' walls. These cells vary in their capabilities, from large cells (i.e., macro cells) to small cells (e.g., micro-cells and pico-cells). This variety in deployment exists to provide both optimal coverage and capacity for cellular users along with operational flexibility. These devices are usually equipped, in addition to the cellular antennas and transceivers, also with GNSS receivers and antennas for network synchronization purposes. Furthermore, city environments include equipment, such as information-kiosks, smart streetlights, digital bus shelters, etc. that are often equipped with GNSS receivers.

The various disclosed embodiments may be performed by a positioning server 140. The positioning server 140 may be a virtual machine, physical machine, and may be deployed in a cloud computing platform (not shown) or on-premises. The cloud computing platform may be a public cloud, a private cloud, a hybrid cloud, and the like. The communication between the positioning server 140 and the sensors 120 and 130 is via a network (not shown), such as a cellular network, a wide area network (WAN), a local area network (LAN), and the like, or any combination thereof.

In the deployment illustrated in FIG. 1, the stationary sensors are placed in an urban environment. According to the disclosed embodiments, to correct the signal delays, and errors induced therefrom, the accurate positions of the sky-level sensors 120 and ground-level sensors 130 can be determined. Such positions can be further utilized to accurately determine the positions of a non-stationary GNSS receiver (e.g., installed in a vehicle 150).

The positions of the stationary sensors (120 and 130) may be determined based on using a surveying positioning service or autonomously measurements using an existing GNSS receivers in the sensors. In the latter embodiment, the position of a stationary sensor can be determined using modified navigation and positioning techniques (e.g., modified RTK, PPP, and the like). As will be discussed below, such modified techniques are based, in part, on satellite measurements collected overtime.

Figure 2:
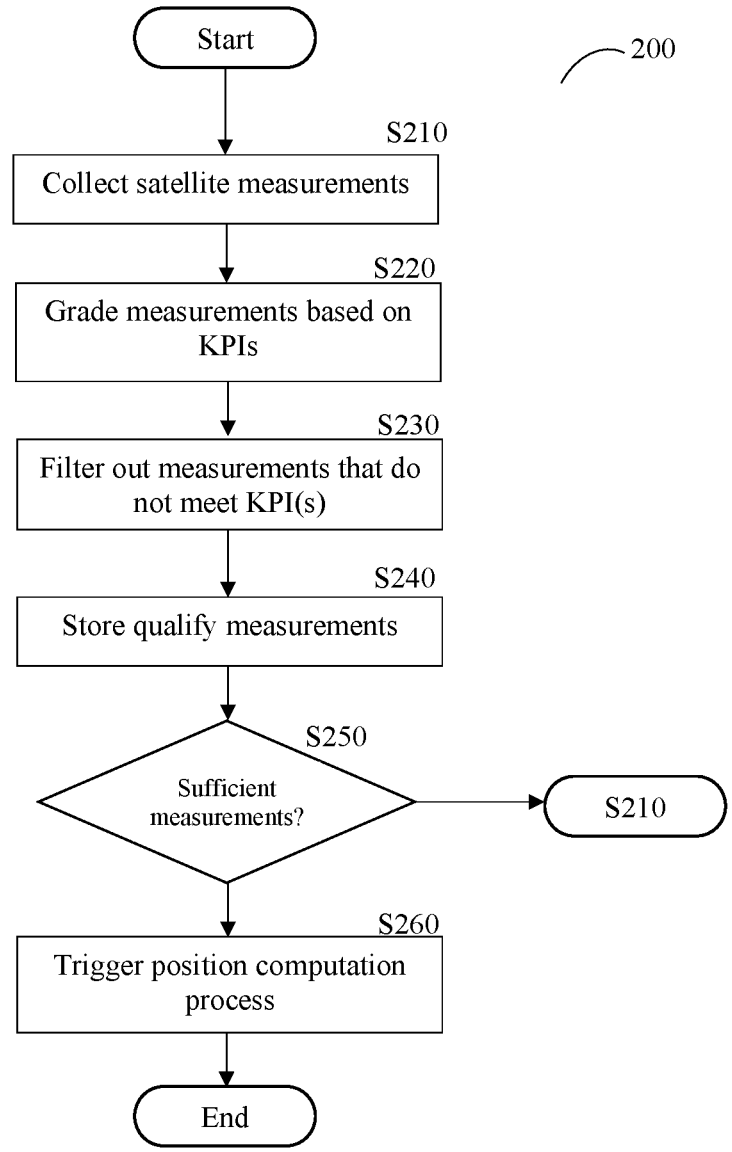
FIG. 2 is a flowchart illustrating a method for collection and filtering satellite measurements according to an embodiment.

FIG. 2 is an example flowchart 200 illustrating a method for collection and filtering satellite measurements according to an embodiment. The method may be performed by a ground-level sensor or a sky-level sensor.

At S210, satellite measurements per epoch are collected. The collection trigger may be originated locally at the sensor itself or externally by, for example, the positioning server 140 (FIG. 1). A satellite measurement may include a code phase, a carrier phase, a Doppler frequency, a signal to noise ratio (SNR), and tracking status indicators.

At S220, each measurement is graded according to several key performance indicators (KPIs). A KPI may include, for example, a number of received satellites, SNR, satellite elevation, multi-path conditions, and so on.

A S230, satellite measurements that do not meet a respective KPI threshold are filtered out. For example, if the measurement for the epoch is received only from one satellite, such measurement may be ignored. In some example embodiments, the S220 and S230 may be performed at a reverse order, that is, all measurements are first saved and then filtered based on the KPI(s). For example, all measurements with a SNR above an average SNR are selected and the rest are filtered out. As another example, all measurements that are in certain multipath conditions are selected.

At S240, selected measurements are stored in a local memory of the sensor, in the positioning server (140, FIG. 1), or both. In an embodiment, satellite measurements are stored prior to transmission and/or storage. When stored in the server a unique identification (UID) of the sensor collecting the measurements is associated with the stored measurements. The UID can be set during an initial sensor registration process or may be an equipment identification provided by a vendor.

At S250, it is checked if sufficient measurements are collected; and if so, at S260, a position computation process is triggered. The sufficient measurements may include a predefined qualified satellite measurement. The position computation process is further discussed in FIG. 3. Otherwise, execution returns to S210 where the sensor continues in collecting more raw measurements.

The above-discussed process is performed by every sensor 120 and 130. Each sensor, to this end, may include a processor and memory storing a set of instructions. The instructions, when executed by the processor, cause the processor to perform the initial position estimate process described herein. In another embodiment, the initial position estimate process may be performed by the positioning server (140, FIG. 1) based on raw measurements collected by the sensors.

It should be noted that processing a single set of measurements from a single sensor typically results in a single positioning solution which is not sufficiently accurate. Thus, measurements are stored and only when a criterion satisfies a predefined condition (e.g., having enough epochs with minimal number of satellites per epoch and minimal signal quality like minimal SNR and/or locking time, and so on) positioning calculation is conducted. A final position is computed considering the gathered measurements, point positions, and overall statistics.

Figure 3:
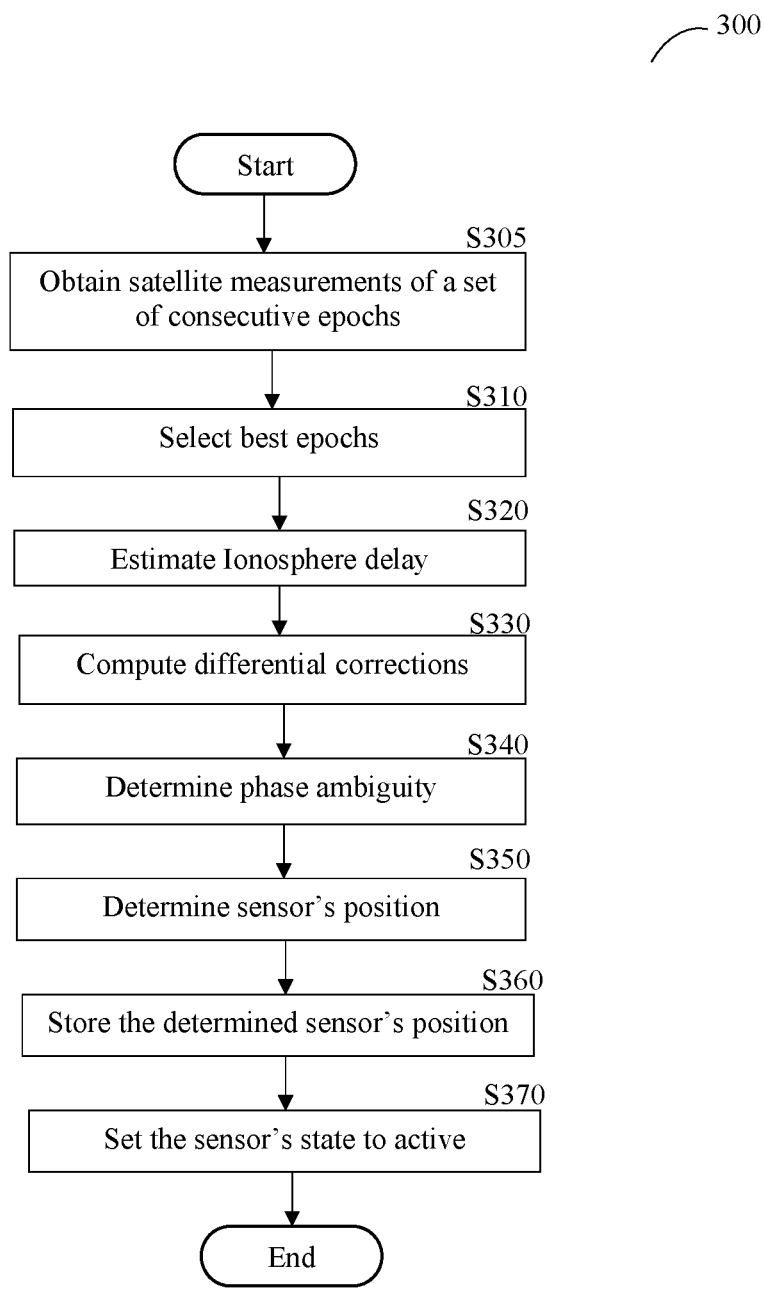
FIG. 3 is an example flowchart for determining accurate position of a stationary sensor on accumulated measurements according to an embodiment.

FIG. 3 is an example flowchart 300 for determining accurate position of a stationary sensor on accumulated measurements according to an embodiment. At S305, satellite measurements of a set of consecutive epochs, each having a list of satellites with reported observables, are obtained from the memory. The memory may include a memory of the positioning server (140, FIG. 1). The obtained epochs may be gathered over time by the server.

Optionally at S310, a selection of best available epochs from the obtained epochs are selected, and measurements of such epochs are utilized. In one embodiment, only measurements from epochs received from at least four satellites are selected and obtained from the memory. In yet another embodiment, measurements from epochs with at most three satellites are selected and obtained from the memory.

It should be noted that GNSS receivers typically use at least four concurrent measurements to extract four unknowns (i.e., receiver position and clock bias) as part of the positioning calculation. However, leveraging the fact that the sensor is stationary one can combine and aggregate multiple consecutive epochs measurements to overcome the lack of a minimal number of visible satellites. This would require formulating receivers clock bias and drift between consecutive epochs properly as part of the combined measurements solution. Another potential scheme to improve and better select combinations of epochs with limited satellites visibility, is to detect the epochs in which satellites are switching from non-line-of-sight (NLOS) propagation to line-of-sight (LOS) propagation in the view of the sensor. This detection can be based on comparison of behavior of the code and phase based measurements, SNR and/or received-signal-strength-indicator (RSSI) between epochs, comparison between the measured ranges, use of receiver embedded MP detectors, tracking loops status or combination between these metrices. Once such epochs are found, the appropriate range between the sensor and the satellite can be extrapolated based on previous adjacent epochs the satellite orbital information (ephemerides) in which the satellite was obstructed (i.e., turned into NLOS). It is important to note that the satellites classification and metric evaluation process is stored as it is useful to predict the satellites availability in a later time phase as the satellites are orbiting earth (roughly twice a day). The stored good-satellites classification is refined every cycle the satellites are in view and incorporated in the joint processing calculation.

In a typical deployment, a ground-level sensor may experience a combination of "less than four" and "at least four" satellites scenarios according to its surrounding position and satellites ever changing geometry in space. Thus, the suggested approach, where the outcomes of all epochs from both types, are combined. This way, the best of the statistics collected from a large data superset is leveraged to generate a position estimate for each of the street level sensors.

At S320, the Ionosphere delay is estimated based on the obtained epochs. The Ionosphere delay may be retrieved from external resources or estimated using conventional models and techniques (e.g., a Klobuchar model).

At S330, differential corrections are computed for a Troposphere delay, a satellite clock bias, and an orbit offset. Similarly, to the Ionospheric corrections, differential corrections can be obtained from external sources or estimated. Additionally, differential correction techniques may be used to enhance the quality of location data gathered using GNSS receivers. The differential corrections are performed using conventional techniques disclosed in the related art.

At S340, a phase ambiguity is determined. When carrier-phase measurements are used to determine a position (based on satellite frequencies), such measurements are ambiguous by an integer multiple of one cycle wavelength. S340 includes resolving the value of this phase ambiguity by providing the correcting integer value. This can be performed using conventional processing techniques, such as, but not limited to a LAMBDA-method. In some cases, soft values of phase ambiguity may be implied, the soft values allow to remove the integer constraint mentioned above.

At S350, the position of a stationary sensor is determined. In an embodiment, S350 includes applying the estimated errors on the epoch measurements to improve their quality. The measurements are ranges based on satellite signals collected and filtered as discussed in FIG. 2. The estimated errors include the Ionospheric delay, Tropospheric delay, and satellite errors. The satellite errors include a satellite clock bias, a satellite orbit offset, and a receiver phase ambiguity resolving (for carrier phase-based measurements). That is, S350 may be viewed as correcting the epochs measurements using the estimated errors. An example process for determining the position of a sensor by application the corrections are discussed below.

The sensor's position may be determined based on statistical methods applied on the estimated errors and measurements. Such methods include least squares or weighted least squares estimation, a median of the distribution, a mean of the distribution, and the like, or any combination thereof. Additionally, recursive schemes incorporating the above, such as Kalman and extended Kalman filters and version of those are also suitable for the sensors position calculation.

At S360, the determined sensor's position is stored in the memory, for example, the memory of the positioning server (140, FIG. 1), at the sensor's memory, or both. Then, at S370, the sensor operational mode is set to 'active'.

It should be noted that the above-mentioned process may continuously update and refine the sensor's position, set as an active, as new measurements are received. Further, refinement of the sensor's position may be based on positions determined for nearby sensors. For example, sky-level sensors are candidates for a faster accurate position acquisition as less signal propagation disturbances may occur. Conversely, ground-level sensors are expected to convergence to an accurate position slowly for the same area. Thus, in an embodiment, a collaborative approach between the various sensors can be utilized, where errors and/or positions determined for sky-level sensors can be applied for nearby ground-level sensors.

The process can be further operable iteratively where the outcome of an iteration station position is fed back to another iteration that potentially monotonically improve the errors derivation resulting in better accurate station position. Lastly, the collected measurements may be processed iteratively, where one iteration processes the measurements from the first to last set of measurements (epochs) and the next iteration starts from the last measurement set and proceeds backwards to the first measurement set.

According to some embodiments, the position of a sky-level sensor can be utilized to correct a position of a nearby ground-level sensor. In one configuration, the generated corrections on the sky-level sensor is forwarded in a physically descriptive manner, that is, providing Ionospheric delay corrections, Tropospheric delay corrections, and satellites orbit offset corrections. This identity tagged correction is also extended to multiple frequency framework where the corrections associated with different frequency are separately generated (i.e., L1, L2, L5 satellite frequencies) and properly tagged. In another configuration, corrections exchange between the sky-level and ground-level sensors includes a combined correction term per each visible satellite where all the correction elements are summed to a single term.

In an embodiment, the generated correction may be modeled by a parametric representation for compressing the data exchange for data connectivity efficiency and extrapolation for latency overcoming. As an example, the Ionospheric delay is known to change very slowly over time, thus the Ionospheric delay can be modeled by a two parameters function as follows:

$$k_{Iono} = k_{Iono}^{a,v} + k_{Iono}^{b,T_o}(t-T_o) \quad (1)$$

where, $k_{Iono}^{a,T_o}$, $k_{Iono}^{b,T_o}$ represent a constant Ionospheric delay element and a slope parameter both defining a piecewise linear function of time with respect to a reference time—$T_o$, correspondingly. This parameter can be calculated by incorporating multiple stationary sensors residing in close vicinity, as the Ionosphere smoothly varies geographically and appears the same for all the close vicinity sensors.

All the methods above and similar methods based on the listed utilize the fact that the sensor's position is stationary. All the above-mentioned architecture results in a sensor position, either a ground-level or sky-level sensor.

Figure 4:
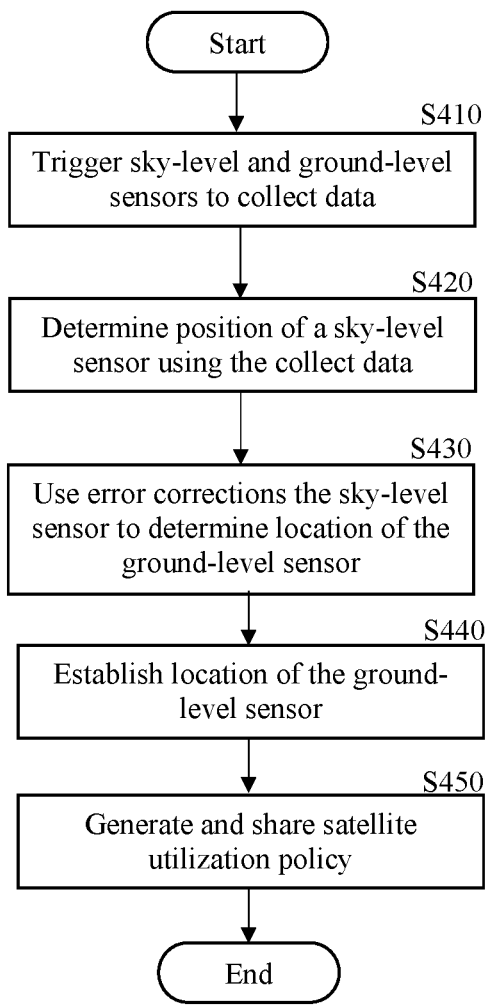
FIG. 4 is a flow diagram illustrating a method for determining a position of a ground-level sensor based on error corrections established for a sky-level sensor according to an embodiment.

FIG. 4 is an example flow diagram illustrating a method for determining a position if a ground-level sensor based on error corrections established for a sky-level sensor.

At S410, both a sky-level sensor and a ground-level sensor are triggered to collect satellite measurements to determine their locations. Here, the sky-level sensor is expected to be operative (i.e., its position has been acquired) prior to the ground-level sensor.

At S420, the position of sky-level sensor is determined, and its operational mode is set to active. Then, at S430 error corrections of the sky-level sensor can be leveraged to determine the location of the ground-level sensor and estimates the location of the ground-level sensor more efficiently. In an embodiment, the error corrections estimated for the sky-level sensor are applied on satellite measurements collected by the ground-level sensors.

In yet another embodiment, S430 includes determining the location of the ground-level sensor based on the sky-level sensor based on a relative satellite navigation technique. As an example, a modified real-time kinematic (RTK) technique may be utilized. In a conventional RTK technique two stations exchange carrier phase information in real-time, such that both stations are locked on the received satellites carrier phases continuously.

Here, the modified RTK technique does not require information to be exchanged in real-time as both sensors are stationary, and their position is fixed. Further, the selection of satellites is based on epochs collected over time. This enable to further reduce errors that induced when utilizing conventional RTK technique. An additional improvement over a conventional RTK technique is achieved by selecting a sky-level sensor that is in close proximity to the ground-level sensor (e.g., less than 1 km).

In an embodiment, S430 may include utilizing a combination of a relative satellite technique with a positioning technique, such as a precise point positioning (PPP) method, and the like.

At S440, the position of the ground-level sensor is established, and thus it is set to active as well.

At S450, a satellite utilization policy is generated based on information (collected measurements and estimated) by the sky-level sensor. The satellite utilization policy defines satellites to use by a stationary sensor during a specific time of the day. The policy may be shared and enforced by any stationary sensor in the vicinity (within a radius of 1 KM) to the sky-level sensor. The satellites in the policy are selected based on their performance, i.e., SNR level, transmission errors, health status, and the like. The satellites listed in the policy may be updated from time to time.

It should be noted that the method discussed herein with a reference to utilizing the positions (and error corrections) acquired for the sky-level sensor to determine location of a ground-level sensor. However, the embodiments disclosed herein, are equally applicable to any type of stationary sensor. That is, a position of a sky-level sensor can be utilized to determine a position of another sky-level sensor, and/or multiple ground-level or sky-level sensors. Further, a ground-level sensor can be utilized to determine a position of another ground-level sensor, a sky-level sensor, and/or multiple ground-level or sky-level sensors.

In an embodiment, the positioning server 140 may be configured to perform joint processing. That is, to process satellite measurements collected from a plurality of stationary sensors to estimate correction errors and determine a position of single sensor.

Following is a discussion for applying corrections on epoch measurements to determine the location of a stationary sensor that may include a sky-level or a ground-level sensor. The following two measurement equations per epoch for code and carrier phase, respectively can be utilized:

$$\varphi_{i,k} = \sqrt{(x_{r,k} - x_{i,k})^2 + (y_{r,k} - y_{i,k})^2 + (z_{r,k} - z_{i,k})^2} +$$
$$dt_{i,k} + dT_k - d^f_{Iono,i,k} + d_{Tropo,i,k} + d_{Orb,i,k} + d^{Amb}_{i,k} + d^{mp}_{i,k} + \varepsilon_{i,k} \quad (2)$$

where, $\varphi_{i,k}$—is a $i^{th}$ satellite measured carrier-phase based range at epoch k [m]; and $P_{i,k}$—is a $i^{th}$ satellite measured code-phase based range at epoch k [m]

$x_r, y_r, z_r$ are the receiver coordinates in Earth Centered Earth Fixed system (ECEF) [m];

$x_i, y_i, z_i$ is the $i^{th}$ satellite coordinates (ECEF) [m];

$dt_i$ is the range added due to satellite clock bias [m];

$dT$ is the range error due receivers side clock bias [m] (common to all tracked satellites; and $d_{Iono,i}^f$ the range error due to Ionospheric first order element [m].

The $d_{Iono,i}^f$ element depends on the carrier frequency, noted in the supper script where $f \in \{L1, L2, L5\}$.

The relation to the carrier frequency is given by:

$$d^f_{Iono,i,k} = ck \frac{TEC}{f^2} \stackrel{def}{=} \frac{k_{Iono,i}}{f^2},$$

where c is the speed of light, k is constant ($1.34 \times 10-3$ [$m^2$/sec]), TEC-total electron count where $1TECu=10^{16}$ [$1/m^2$], and the frequency f is measured by [MHz]. The value $k_{Iono,i}$ is defined to be the Ionospheric delay coefficient which is free of signal carrier frequency [m/sec$^2$], $d_{Tropo,i}$ is the range error associated with Tropospheric delay [m], $d_{Orb,i}$ is the range error due to the $i^{th}$ satellite orbit mismatch [m], $d_i^{Amb}$ is the range error due to unresolved phase ambiguity [m], $d_{i,k}^{mp}$ is the range error due to multipath (MP) effects on carrier phase measurements [m], $d_{i,k}^{MP}$ is the range error due to multipath effects on code phase measurements [m], $\varepsilon_i$ is the carrier phase ranging error [m], and $\epsilon_i$ is a code phase ranging error [m].

It should be noted that $\varphi_i$ is a biased ranging estimation due to $d_i^{Amb}$, $P_i$ is an unbiased ranging estimation to the $i^{th}$ satellite, $\varepsilon_i << \epsilon_i$ typically, with two to three orders of magnitude. $d_{Iono,i,k}^f$ affects in opposite sign the phase and code measurement. Here, it is further assumed that $x_r, y_r, z_r$ and $x_i, y_i, z_i$ are known values. In open sky conditions, $d_{i,k}^{mp}$ and $d_{i,k}^{MP}$ are neglected.

Optimal satellites selection is highly correlated with the location of the ground-level sensors. Even relatively closely located sensors (e.g., within a 1 KM radius) may have substantial difference in optimal satellites set. The process can highly benefit from close by sky-level sensors with LOS to satellites or close ground level sensors.

Differential corrections in dual frequency receivers can be determined when the phase is tracked concurrently in two frequencies (e.g. L1,L2 or L1,L5) and can combine the two measurements. The L1,L2 combination results in:

$$\varphi_i^{L1} - \varphi_i^{L2} = -d_{Iono,i}^{L1} + d_{i,L1}^{Amb} + \varepsilon_{i,L1} + d_{Iono,i}^{L2} - d_{i,L2}^{Amb} - \varepsilon_{i,L2} \quad (4)$$

The L1, L2 carrier phase difference may be expressed as follows:

$$\delta_{\varphi,i}^{L1,L2} = (\alpha_1 - \alpha_2)k_{Iono,i} + \delta_{amb,i}^{L1,L2} + \varepsilon_{i,L1-L2} \quad (5)$$

where, $\delta_{\varphi,i}^{L1,L2}$ is a single difference of measured range based on carrier phase on L1, L2 to a specific satellite [m]; $\delta_{amb,i}^{L1,L2}$ is a difference in carrier phase ambiguity at the two tracking channels corresponding to L1 and L2; $\varepsilon_{i,L1-L2}$ is a combined thermal noise term of the two channels measurement differencing function; $k_{Iono,i}$ is a range error factor due to ionospheric induced delay [m/sec$^2$], and $\alpha_1, \alpha_2$ is a frequency factor to the pure Ionosphere ranging error corresponding to L1 and L2, respectively.

The relation between $\alpha_1, \alpha_2$ and frequency is as follows:

$$\alpha_1 = -\frac{1}{f_1^2}, \alpha_2 = -\frac{1}{f_2^2}, \quad (6)$$

All the element in (5) are constants as $f_1$, $f_2$ (and $f_5$) are known, thus $k_{Iono,i}$ can be expressed as:

$$\hat{k}_{Iono,i} = \frac{\delta_{\varphi,i}^{L1,L2}}{\alpha_1 - \alpha_2} + \eta_{12} \quad (7)$$

The estimation error $\eta_{12}$ and the Ionospheric range error estimates are presented in the sequel where the proposed system is presented. The Ionospheric error estimate as provided by Eq. (6) can be used to generate a correction model.

It should be noted that Ionosphere delay changes at a relative slow pace and slowly changes in space. Therefore, multiple epochs can be incorporated to better estimate the Ionosphere error. Additionally, measurements from multiple stationary sensors located in close vicinity can be jointly processed to reduce the estimation errors and eliminate the need to retrieve error corrections from external sources. Further, a group (network) of stationary sensors can compute or otherwise estimate the corrections in real-time, and share such corrections with other stationary and non-stationary sensors—deployed in a close proximity.

The disclosed embodiments can further improve the accuracy of the determined positions of stationary sensors. For example:

(a) Ionosphere delay models can provide a baseline (first order or correction), and residual estimate can be performed to improve the delay model. Such baseline can potentially be combined with second and third orders of corrections.

(b) Removing the phase ambiguity would reduce a substantial portion of the estimation error. The phase ambiguity can be reduced using a LAMBDA method.

(c) Due to the slow variation in the Ionosphere delay an averaging over consecutive Ionospheric delay per satellite would reduce the respective additive noise component.

(d) Combining error estimates of multiple receivers, located in close vicinity, can reduce both the noise component and the phase ambiguity component in the Ionosphere delay estimation error. This approach is referred to spatial averaging.

(e) Combining code and phase measurements code measurements are noisier, but unbiased in nature. Utilizing equation (6) for the code measurements results in:

$$\delta_{P,i}^{L1,L2} = (\alpha_1 - \alpha_2)k_{Iono,i} + \epsilon_{i,L1-L2}, \quad (8)$$

where ambiguity element does not exist, but the noise term is in the order of code tracking noise stability rather than phase tracking. That is, two to three orders of magnitude larger in standard deviation compared to the phase equivalent. Still, combining multiple receivers code-based Ionosphere delay estimators may gain better performance when properly weighted (i.e., weighted least squares estimation WLS).

The differential error is considered between two concurrently carrier phase measurement ranges corresponding to two satellites by applying Equation (1) to satellites i and j. This difference is denoted as differential phase bias (DPB), where the DPBs of two satellites are considered and removing the Ionosphere range effects. This can be presented using the following equations:

$$DPB(i,j,k,f) = P_{i,k}^f - P_{j,k}^f + d_{Iono,i}^f - d_{Iono,j}^f = \rho_{i,k} - \rho_{j,k} + dt_{i,k} - dt_{j,k} + d_{Tropo,i,k} - d_{Tropo,j,k} + d_{Orb,i,k} - d_{Orb,j,k} + \epsilon_{i,k} - \epsilon_{j,k} = \delta_{i,j,k}^P + \delta_{i,j,k}^t + \delta_{i,j,k}^T + \delta_{i,j,k}^{Orb} + v_{i,j,k} \quad (9)$$

Where in Equation (9):

$\hat{d}_{Iono,i}^f$—the Ionosphere delay estimate based on the factor derived in Equations (6) and (7):

$$\hat{d}_{Iono,i}^f = \frac{\hat{k}_{Iono,i}}{f^2}$$

$\delta_{i,j,k}^P$ is a difference between calculated range from satellite i and satellite j to the receiver at epoch k;

$\delta_{i,j,k}^t$ is a difference between calculated satellite i and satellite j clock biases at epoch k;

$\delta_{i,j,k}^T$ is a difference between satellite i and satellite j Tropospheric delay at epoch k;

$\delta_{i,j,k}^{Orb}$ is a difference between satellite i and satellite j orbital positions at epoch k; projections on the vectors defined by the receiver location to the satellites, correspondingly;

$\eta_{i,j,k}$ is a carrier phase noise difference and phase ambiguity uncertainties difference at epoch k; and f-represents the frequency for each the DPB is carried out for (e.g. L1, L2 or L5.

$\delta_{i,j,k}^t$ and $\delta_{i,j,k}^T$ in Equation (9) are partially available through model and by satellites broadcast messages. However, an existing residual error is potentially measured using the metric in Equation (9) and the measurement provides a differential bias in real time unlike repeatedly broadcasted models. It is further pointed out that averaging the metric above, justified by the fact that the differential bias is relatively stable in time, reported by multiple receivers in close vicinity, improves the outcome of the above error sources.

Similarly, let us define an Ionospheric free differential code bias (DCB) as follows:

$$DCB(i,j,k,f) = P_{i,k}^f - P_{j,k}^f + d_{Iono,i}^f - d_{Iono,j}^f = \rho_{i,k} - \rho_{j,k} + dt_{i,k} - dt_{j,k} + d_{Tropo,i,k} - d_{Tropo,j,k} + d_{Orb,i,k} - d_{Orb,j,k} + \epsilon_{i,k} - \epsilon_{j,k} = \delta_{i,j,k}^P + \delta_{i,j,k}^t + \delta_{i,j,k}^T + \delta_{i,j,k}^{Orb} + v_{i,j,k} \quad (10)$$

A noted difference between Equations (8) and (9) is in the residual noise term, i.e., $v_{i,j,k}$, which is ambiguity free but with substantially larger noise standard deviation (e.g. typical result of code tracking vs. carrier phase tracking). It should be noted that both Equations (9) and (10) are applicable also for frequencies L2 and L5 as well as the combination of those once available (e.g., $P_{i,k}^{L1} - P_{j,k}^{L2} + d_{Iono,i}^{L1} - d_{Iono,j}^{L2}$ etc.).

Unlike the Ionosphere estimate introduced in Equations (6) and (7) the differential corrections introduced in Equations (9) and (10) are relative to a selected satellite rather than absolute (e.g., i=1 for the sake of simplicity and without loss of generality). From a practical sense, satellite i=1 is not necessarily visible and some certain of management and protocol formulation is required to ensure: the validity and continuity of the corrections over time, and that the use of the corrections provided at the receivers' side properly adjust the biases for the entire constellation.

The differential corrections align the entire set of a constellation (e.g. NAVSTAR-GPS) satellites to its first indexed satellite which introduce a substantial correction. The reason for that is that satellites models may drift up to several nano seconds (i.e. equivalent to few meters in range) in both positive and negative directions which further increase the positioning inaccuracy.

As for the first satellite, the residual error corrections for it may be taken from a model, while still allowing residual real time errors to exist. This residual term is common to all the constellation by definition and is with very limited impact to the positioning accuracy due to the inherent ability of GPS positioning solution to reject a local clock imperfection (common to all measured satellites). The local clock bias estimation which is an embedded key element in all GPS receivers, in this case is expected to 'absorb' the above addressed residual uncertainty.

Once the corrections derived in Equations (6-10) are available to a receiver, the receiver needs to apply those corrections to its measurements prior to a positioning estimation function. Note that different correction calculation applies for code and phase as follows:

$$\tilde{P}_{i,k}^f = P_{i,k}^f - d_{Iono,i}^f - DCB(i, i_0, k, f) \quad (11)$$

$$\tilde{\varphi}_{i,k}^f = \varphi_{i,k}^f + d_{Iono,i}^f - DPB(i, i_0, k, f) \quad (12)$$

where $\tilde{P}_{i,k}^f$ and $\tilde{\varphi}_{i,k}^f$ are the corrected code range and carrier phase range measurements, respectively, for the $i^{th}$ satellite at epoch k. $i_0$ denotes the reference satellite for the $k^{th}$ epoch to whom the DCB and DPB calculation where referenced.

The above discussion relates to corrections that can be performed by the server 140, according to one embodiment. Other embodiments where different set of equations, parameters, and settings can be utilized. It is further noted that since potentially all the sky-level sensors experience a similar disturbance source, any joint processing techniques combining all the observables streamed are envisioned, to name a few such joint processing techniques: averaging, filtering, order statistics, selection, and combining.

In another yet embodiment, provisioning and corrections is performed in a centralized manner by the server 140 or a distributed manner by the sensors. When performed by the server, the corrections are performed based on the collected data, sensors position\. An important note is that the generated corrections are applicable to both single frequency and dual frequency receivers regardless the sensors equipment type and specifications.

Figure 5:
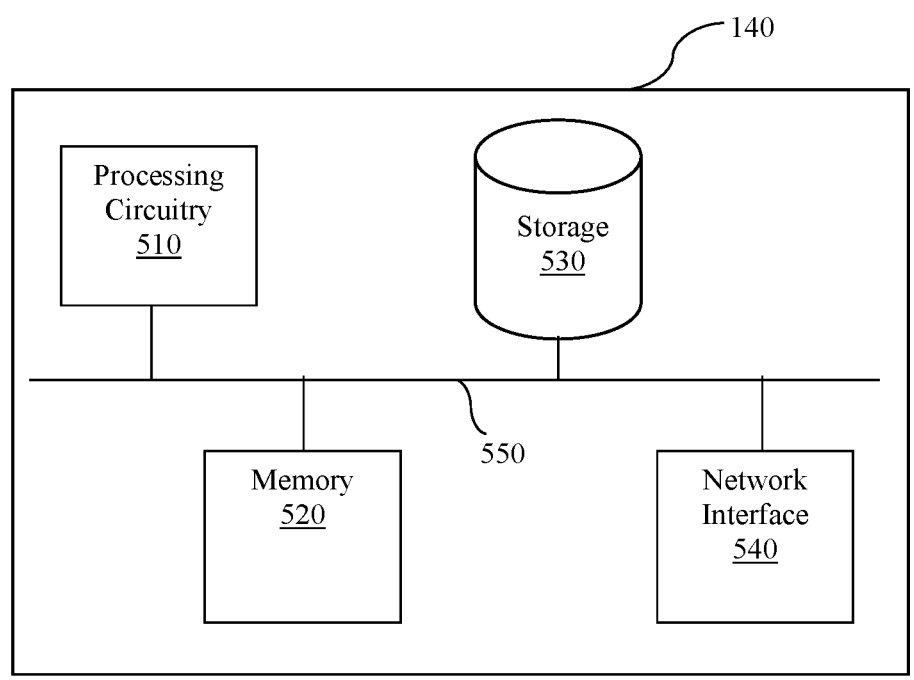
FIG. 5 is a hardware block diagram depicting a positioning server according to an embodiment.

FIG. 5 is an example hardware block diagram depicting the positioning server 140, according to an embodiment. The positioning server 140 includes a processing circuitry 510 coupled to a memory 520, a storage 530, and a network interface 540. In an embodiment, the components of the positioning server 140 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof. The memory 520 may store the epoch measurements, and other data used for the correction.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or another memory technology, compact disk-read only memory (CD-ROM), Digital Versatile Disks (DVDs), or any other medium which can be used to store the desired information.

The network interface 540 allows the positioning server 140 to communicate with the various components, devices, and systems described herein for network analysis, as well as other, like, purposes.

It should be understood that the embodiments described herein are not limited to the specific architecture illustrated in FIG. 5, and other architectures may be equally used without departing from the scope of the disclosed embodiments.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should also be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C, 3A; A and B in combination; B and C in combination; A and C in combination; A, B, and C in combination; 2A and C in combination; A, 3B, and 2C in combination; and the like.

What is claimed is:

1. A method for determining accurate positions of stationary global navigation satellite system (GNSS) sensors, comprising:
triggering collection of satellite measurements by each of
at least a first stationary GNSS sensor and a second stationary GNSS sensor, wherein the satellite measurements are collected per epoch;
determining a position of the first stationary GNSS sensor using the satellite measurements collected by the first stationary GNSS sensor; and
determining a position of the second stationary GNSS sensor using the satellite measurements collected by the second stationary GNSS sensor and at least the determined position of the first stationary GNSS sensor, wherein the first stationary GNSS sensor is deployed in a vicinity of the second stationary GNSS sensor.

2. The method of claim 1, wherein the first stationary GNSS sensor is a sky-level sensor and the second stationary GNSS sensor is a ground-level sensor.

3. The method of claim 1, wherein triggering collection of satellite measurements further comprising:
collecting satellite measurements per epoch;
grading the collected satellite measurements based on at least one key performance indicator (KPI);
selecting collected satellite measurements that meet a threshold predefined for the at least one KPI; and
storing the selected satellite measurements.

4. The method of claim 3, wherein the satellite measurement is any one of: a code phase, a carrier phase, a Doppler frequency, a signal to noise ratio (SNR) and tracking status indicators, wherein the at least one KPI is any one of: a number of received satellites, a SNR, satellites elevation, and multi-path conditions.

5. The method of claim 3, further comprising:
checking if there are sufficient number of stored satellite measurements for the first stationary GNSS sensor; and
triggering the determination of the position of the first stationary GNSS sensor when satellite measurements are stored.

6. The method of claim 5, determining the position of the first stationary GNSS sensor further comprises:
obtaining from the stored selected satellite measurements, satellite measurements of a set of consecutive epochs;
estimating an Ionosphere delay;
estimating differential corrections for a Troposphere delay, a satellite clock bias, and an orbit offset;
estimating phase ambiguity;
determining the position of the first stationary GNSS sensor by applying the estimated Ionosphere delay, differential corrections, and phase ambiguity on the obtained satellite measurements; and
storing the determined position.

7. The method of claim 6, further comprising:
selecting best epochs from the set of consecutive epochs, wherein the best epochs are received either from four satellites or at most three satellites.

8. The method of claim 7, wherein the best epochs are epochs in which satellites detected in a line-of-sight (LOS) propagation in view of the first stationary GNSS sensor.

9. The method of claim 6, wherein determining the position of the second stationary GNSS sensor further comprises:
applying the Ionosphere delay, differential corrections, and phase ambiguity estimated for first stationary GNSS sensor on the satellite measurements collected for the second stationary GNSS sensor.

10. The method of claim 6, wherein determining the position of the second stationary GNSS sensor further comprises:
using at least a relative satellite navigation technique to determine at least the position of the stationary GNSS sensor using the position of the first stationary GNSS sensor, wherein the satellite measurements utilized by the relative satellite navigation technique are gathered over time.

11. The method of claim 6, further comprising:
using the position determined using a relative satellite navigation technique to determine a position of at least a third stationary GNSS sensor located in the vicinity of the first stationary GNSS sensor.

12. The method of claim 1, further comprising:
generating a satellite utilization policy, wherein the satellite utilization policy lists optimal satellites at certain times of day; and
sharing the generated satellite utilization policy with GNSS sensors in the vicinity of the first stationary GNSS sensor.

13. The method of claim 1, further comprising:
joint processing satellite measurements collected by a plurality stationary GNSS sensors to estimate Ionosphere delay, differential corrections, and phase ambiguity.

14. The method of claim 1, wherein the method is performed by a centralized system that is external to the first and second stationary GNSS sensors.

15. A non-transitory computer readable medium having stored thereon instructions for causing a processing circuitry to execute a process for determining accurate positions of stationary global navigation satellite system (GNSS) sensors, comprising:
triggering collection of satellite measurements by each of at least a first stationary GNSS sensor and a second stationary GNSS sensor, wherein the satellite measurements are collected per epoch;
determining a position of the first stationary GNSS sensor using the satellite measurements collected by the first stationary GNSS sensor; and
determining a position of the second stationary GNSS sensor using the satellite measurements collected by the second stationary GNSS sensor and at least the determined position of the first stationary GNSS sensor, wherein the first stationary GNSS sensor is deployed in a vicinity of the second stationary GNSS sensor.

16. A system for executing a process for determining accurate positions of stationary global navigation satellite system (GNSS) sensors, comprising:
a processing circuitry; and
a memory, the memory containing instructions that, when executed by the processing circuitry, configure the system to:
trigger collection of satellite measurements by each of at least a first stationary GNSS sensor and a second stationary GNSS sensor, wherein the satellite measurements are collected per epoch;
determine a position of the first stationary GNSS sensor using the satellite measurements collected by the first stationary GNSS sensor; and
determine a position of the second stationary GNSS sensor using the satellite measurements collected by the second stationary GNSS sensor and at least the determined position of the first stationary GNSS sensor, wherein the first stationary GNSS sensor is deployed in a vicinity of the second stationary GNSS sensor.

17. The system of claim 16, wherein the first stationary GNSS sensor is a sky-level sensor and the second stationary GNSS sensor is a ground-level sensor.

18. The system of claim 16, wherein the system is configured to:
collect satellite measurements per epoch;

grade the collected satellite measurements based on at least one key performance indicator (KPI);
select collected satellite measurements that meet a threshold predefined for the at least one KPI; and
store the selected satellite measurements.

19. The system of claim 18, wherein the satellite measurement is any one of: a code phase, a carrier phase, a Doppler frequency, a signal to noise ratio (SNR) and tracking status indicators, wherein the at least one KPI is any one of: a number of received satellites, a SNR, satellites elevation, and multi-path conditions.

20. The system of claim 18, wherein the system is further configured:
check if there are sufficient number of stored satellite measurements for the first stationary GNSS sensor; and
triggering the determination of the position of the first stationary GNSS sensor when satellite measurements are stored.

21. The system of claim 20, wherein the system is further configured:
obtain from the stored selected satellite measurements, satellite measurements of a set of consecutive epochs;
estimate an Ionosphere delay;
estimate differential corrections for a Troposphere delay, a satellite clock bias, and an orbit offset;
estimate phase ambiguity;
determine the position of the first stationary GNSS sensor by applying the estimated Ionosphere delay, differential corrections, and phase ambiguity on the obtained satellite measurements; and
store the determined position.

22. The system of claim 21, wherein the system is further configured to:
select best epochs from the set of consecutive epochs, wherein the best epochs are received either from four satellites or at most three satellites.

23. The system of claim 22, wherein the best epochs are epochs in which satellites detected in a line-of-sight (LOS) propagation in view of the first stationary GNSS sensor.

24. The system of claim 23, wherein the system is further configured to:
apply the Ionosphere delay, differential corrections, and phase ambiguity estimated for first stationary GNSS sensor on the satellite measurements collected for the second stationary GNSS sensor.

25. The system of claim 20, wherein the system is further configured to:
use at least a relative satellite navigation technique to determine at least the position of the stationary GNSS sensor using the position of the first stationary GNSS sensor, wherein the satellite measurements utilized by the relative satellite navigation technique are gathered over time.

26. The system of claim 25, wherein the system is further configured to:
use the position determined using the relative satellite navigation technique to determine a position of at least a third stationary GNSS sensor located in the vicinity of the first stationary GNSS sensor.

27. The system of claim 16, wherein the system is further configured to:
generate a satellite utilization policy, wherein the satellite utilization policy lists optimal satellites at certain times of day; and
share the generated satellite utilization policy with GNSS sensors in the vicinity of the first stationary GNSS sensor.

28. The system of claim 16, wherein the system is further configured to:
joint process satellite measurements collected by a plurality stationary GNSS sensors to estimate Ionosphere delay, differential corrections, and phase ambiguity.

29. The system of claim 16, wherein the system is external to the first and second stationary GNSS sensors.

* * * * *